United States Patent
Amano et al.

(10) Patent No.: US 10,720,612 B2
(45) Date of Patent: Jul. 21, 2020

(54) BATTERY PACKAGING MATERIAL, BATTERY, AND METHOD FOR PRODUCING BATTERY PACKAGING MATERIAL

(71) Applicant: DAI NIPPON PRINTING CO., LTD., Tokyo (JP)

(72) Inventors: Makoto Amano, Tokyo (JP); Daisuke Yasuda, Tokyo (JP); Takanori Yamashita, Tokyo (JP); Rikiya Yamashita, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/777,241

(22) PCT Filed: Nov. 29, 2016

(86) PCT No.: PCT/JP2016/085425
§ 371 (c)(1),
(2) Date: May 18, 2018

(87) PCT Pub. No.: WO2017/094724
PCT Pub. Date: Jun. 8, 2017

(65) Prior Publication Data
US 2018/0331330 A1    Nov. 15, 2018

(30) Foreign Application Priority Data

Nov. 30, 2015   (JP) .................................. 2015-232999

(51) Int. Cl.
*H01M 2/00* (2006.01)
*H01M 2/02* (2006.01)
(Continued)

(52) U.S. Cl.
CPC ............. *H01M 2/0287* (2013.01); *B32B 3/00* (2013.01); *B32B 15/00* (2013.01); *H01G 11/78* (2013.01); *H01G 11/80* (2013.01); *H01M 2/08* (2013.01)

(58) Field of Classification Search
CPC .............................. H01M 2/0287; H01M 2/08
See application file for complete search history.

(56) References Cited

U.S. PATENT DOCUMENTS

| | | | | |
|---|---|---|---|---|
| 2003/0054241 A1* | 3/2003 | Yamashita | ............ | H01M 2/021 429/181 |
| 2008/0286635 A1 | 11/2008 | Seino et al. | | |
| 2016/0290917 A1* | 10/2016 | Hamann | ................ | G01N 19/04 |

FOREIGN PATENT DOCUMENTS

| JP | 2003-288866 A | 10/2003 |
|---|---|---|
| JP | 2008-287971 A | 11/2008 |

(Continued)

OTHER PUBLICATIONS

Feb. 21, 2017 International Search Report issued in International Patent Application No. PCT/JP2016/085425.

*Primary Examiner* — Jane J Rhee
(74) *Attorney, Agent, or Firm* — Oliff PLC (57) ABSTRACT

A battery packaging material that is excellent in continuous productivity of batteries. A battery packaging material comprising a laminate having at least a base material layer, a barrier layer, and a heat-sealable resin layer in this order, wherein the heat-sealable resin layer contains a lubricant, and when a Vickers-shaped indenter is pressed into a surface of the heat-sealable resin layer opposite to the barrier layer at a loading speed of 5 mN/10 sec, using PICODENTOR (registered trademark) HM500, in an environment at a temperature of 24° C. and a relative humidity of 50%, an (Continued)

indentation depth of the indenter into the heat-sealable resin layer at the point when a load on the indenter reaches 3.0 mN is 5.8 μm or less.

16 Claims, 2 Drawing Sheets

(51) Int. Cl.
    *H01G 11/78*     (2013.01)
    *B32B 3/00*     (2006.01)
    *B32B 15/00*     (2006.01)
    *H01G 11/80*     (2013.01)
    *H01M 2/08*     (2006.01)

(56) References Cited

FOREIGN PATENT DOCUMENTS

| | | |
|---|---|---|
| JP | 2013-101764 A | 5/2013 |
| JP | 2016-184547 A | 10/2016 |
| JP | 2016-186934 A | 10/2016 |

\* cited by examiner

BATTERY PACKAGING MATERIAL, BATTERY, AND METHOD FOR PRODUCING BATTERY PACKAGING MATERIAL

TECHNICAL FIELD

The present invention relates to a battery packaging material, a battery, and a method for producing a battery packaging material.

BACKGROUND ART

Various types of batteries have been heretofore developed, and in every battery, a packaging material is an essential member for sealing battery elements such as an electrode and an electrolyte. Metallic packaging materials have been heretofore widely used as battery packaging materials. In recent years, along with improvements in the performance of electric cars, hybrid electric cars, personal computers, cameras, mobile phones, and the like, batteries have been required to be diversified in shape, and to be thinner and lighter weight. However, the widely used metallic battery packaging materials are disadvantageous in that they have difficulty in keeping up with the diversification of shapes, and are limited in weight reduction.

Thus, a film-shaped laminate in which a base material layer/an adhesive agent layer/a barrier layer/a heat-sealable resin layer are laminated in this order has been proposed as a battery packaging material that can be readily processed into various shapes, and can achieve a thickness reduction and a weight reduction (see, for example, Patent Literature 1). This film-shaped battery packaging material is formed such that the battery elements can be sealed by heat-welding, by means of heat-sealing, the peripheral region with the heat-sealable resin layer being opposed to itself.

At the time of sealing the battery elements, the battery packaging material is molded in a mold such that a space for housing the battery elements is formed. During this molding, the battery packaging material is stretched, which is likely to cause cracks or pinholes in the barrier layer at the flange of the mold. To solve this problem, a method for improving the lubricity of the heat-sealable resin layer is known, in which the surface of the heat-sealable resin layer of the battery packaging material is coated with a lubricant, or a lubricant is added to the resin forming the heat-sealable resin layer to cause bleed-out of the lubricant on the surface. By adopting this method, the battery packaging material is readily drawn into the mold during molding, which allows the formation of cracks or pinholes in the battery packaging material to be suppressed.

CITATION LIST

Patent Literature

Patent Literature 1: JP 2008-287971 A

SUMMARY OF INVENTION

Technical Problem

The inventors of the present invention conducted research on the molding conditions of a battery packaging material. As a result, they found that when, for example, a mold made of stainless steel having high surface smoothness (for example, stainless steel having a surface Rz (maximum height of roughness profile) of 0.8 μm or less, as specified in Table 2 of JIS B 0659-1: 2002 Appendix 1 (Referential) Surface Roughness Standard Specimens for Comparison) is used as the mold for molding the battery packaging material, the area of contact between the mold and the heat-sealable resin layer is large, and thus, the surface of the heat-sealable resin layer is likely to be abraded, which is likely to cause the lubricant positioned on the surface of the heat-sealable resin layer to be transferred into the mold during molding, resulting in contamination of the mold.

If another battery packaging material is molded in the mold that is still contaminated with the lubricant, masses of the lubricant adhering to the mold adhere to the surface of the battery packaging material, and are directly subjected to heat-sealing of the heat-sealable resin layer. In this case, during heat-sealing of the heat-sealable resin layer, the region to which the lubricant adheres does not melt uniformly, which causes defective sealing. To prevent this, it is necessary to increase the frequency of cleaning to remove the lubricant adhering to the mold, which reduces the continuous productivity of batteries.

It is a main object of the present invention to provide a battery packaging material that is excellent in continuous productivity of batteries and a method for producing the same.

Solution to Problem

The inventors of the present invention conducted extensive research to solve the aforementioned problem. As a result, they found that in the case of a battery packaging material comprising a laminate having at least a base material layer, a barrier layer, and a heat-sealable resin layer in this order, wherein the heat-sealable resin layer contains a lubricant, and when a Vickers-shaped indenter is pressed into a surface of the heat-sealable resin layer opposite to the barrier layer at a loading speed of 5 mN/10 sec, using PICODENTOR (registered trademark) HM500, in an environment at a temperature of 24° C. and a relative humidity of 50%, an indentation depth of the indenter into the heat-sealable resin layer at the point when a load on the indenter reaches 3.0 mN is 5.8 μm or less, even when the battery packaging material is molded using a mold made of stainless steel having high surface smoothness, for example, the lubricant is unlikely to adhere to the mold, and excellent continuous productivity of batteries is achieved. The present invention was completed as a result of further research based on these findings.

In summary, the present invention provides aspects of invention as itemized below:

Item 1. A battery packaging material comprising:

a laminate having at least a base material layer, a barrier layer, and a heat-sealable resin layer in this order, wherein the heat-sealable resin layer contains a lubricant, and when a Vickers-shaped indenter is pressed into a surface of the heat-sealable resin layer opposite to the barrier layer at a loading speed of 5 mN/10 sec, using PICODENTOR (registered trademark) HM500, in an environment at a temperature of 24° C. and a relative humidity of 50%, an indentation depth of the indenter into the heat-sealable resin layer at the point when a load on the indenter reaches 3.0 mN is 5.8 μm or less.

Item 2. The battery packaging material according to item 1, wherein a dynamic friction coefficient of the surface of the heat-sealable resin layer opposite to the barrier layer is 0.4 or less, as measured under the following test conditions:

(Test Conditions)

the battery packaging material is allowed to stand, with the heat-sealable resin layer facing down, on a surface of a metal plate having a rectangular shape in a plan view, which is allowed to stand on a horizontal surface; a 200-g weight is then placed on a surface of the battery packaging material having the base material layer; and the battery packaging material is then pulled 25 mm in a horizontal direction at a tensile speed of 100 mm/min, and a dynamic friction coefficient at this time is measured, wherein the metal plate is made of stainless steel having a surface Rz (maximum height of roughness profile) of 0.8 μm, as specified in Table 2 of JIS B 0659-1: 2002 Appendix 1 (Referential) Surface Roughness Standard Specimens for Comparison; an area of contact between the surface of the metal plate and the heat-sealable resin layer of the battery packaging material is 160 $cm^2$; and an area of contact between the weight and the surface of the battery packaging material having the base material layer is 40 $cm^2$.

Item 3. The battery packaging material according to item 1 or 2, wherein a resin forming the heat-sealable resin layer is polypropylene.

Item 4. The battery packaging material according to any one of items 1 to 3, comprising an adhesive layer formed of acid-modified polypropylene between the barrier layer and the heat-sealable resin layer.

Item 5. The battery packaging material according to any one of items 1 to 4, wherein the barrier layer is formed of an aluminum alloy or stainless steel.

Item 6. The battery packaging material according to any one of items 1 to 5, comprising an acid resistance film layer on at least one surface of the barrier layer.

Item 7. The battery packaging material according to any one of items 1 to 6, which is a packaging material for secondary batteries.

Item 8. A battery comprising a battery element comprising at least a positive electrode, a negative electrode, and an electrolyte, the battery element being housed in a package formed of the battery packaging material according to any one of items 1 to 7.

Item 9. A method for producing a battery packaging material comprising the step of:

laminating at least a base material layer, a barrier layer, and a heat-sealable resin layer in this order to provide a laminate, wherein a heat-sealable resin layer containing a lubricant is used as the heat-sealable resin layer, and the heat-sealable resin layer laminated in the step is a heat-sealable resin layer in which, when a Vickers-shaped indenter is pressed into a surface of the heat-sealable resin layer opposite to the barrier layer at a loading speed of 5 mN/10 sec, using PICODENTOR (registered trademark) HM500, in an environment at a temperature of 24° C. and a relative humidity of 50%, an indentation depth of the indenter into the heat-sealable resin layer at the point when a load on the indenter reaches 3.0 mN is 5.8 μm or less.

Advantageous Effects of Invention

According to the present invention, a battery packaging material that is excellent in continuous productivity of batteries and a method for producing the same can be provided.

DESCRIPTION OF EMBODIMENTS

A battery packaging material of the present invention comprises a laminate having at least a base material layer, a barrier layer, and a heat-sealable resin layer in this order, wherein the heat-sealable resin layer contains a lubricant, and when a Vickers-shaped indenter is pressed into a surface of the heat-sealable resin layer opposite to the barrier layer at a loading speed of 5 mN/10 sec, using PICODENTOR (registered trademark) HM500, in an environment at a temperature of 24° C. and a relative humidity of 50%, an indentation depth of the indenter into the heat-sealable resin layer at the point when a load on the indenter reaches 3.0 mN is 5.8 μm or less. The battery packaging material of the present invention and a method for producing the same will be hereinafter described in detail.

In the present specification, any numerical range indicated by " . . . to . . . " is intended to mean " . . . or more" and " . . . or less". For example, the recitation "2 to 15 mm" is intended to mean 2 mm or more and 15 mm or less.

1. Laminated Structure of Battery Packaging Material

Figure 1:
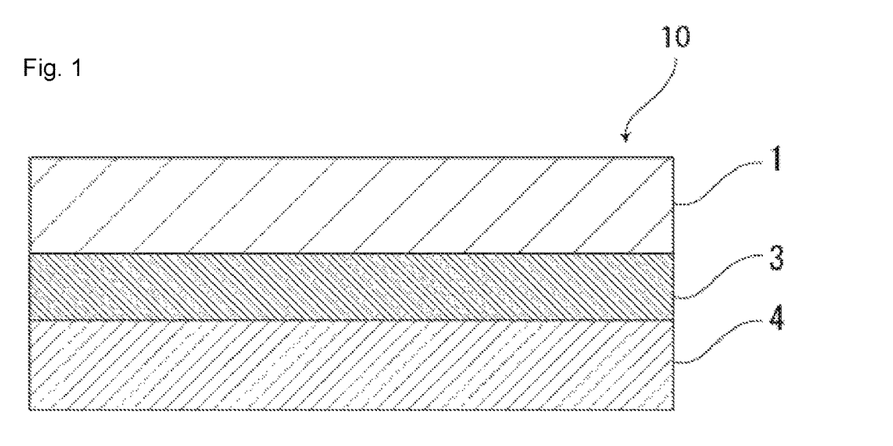
FIG. 1 is a diagram showing one example of a cross-sectional structure of a battery packaging material of the present invention.

As shown in FIG. 1, a battery packaging material 10 comprises a laminate having at least a base material layer 1, a barrier layer 3, and a heat-sealable resin layer 4 in this order. In the battery packaging material of the present invention, the base material layer 1 is an outermost layer, and the heat-sealable resin layer 4 is an innermost layer. That is, during the assembly of a battery, the heat-sealable resin layer 4 positioned on the periphery of a battery element is heat-welded with itself to hermetically seal the battery element, such that the battery element is encapsulated.

Figure 2:
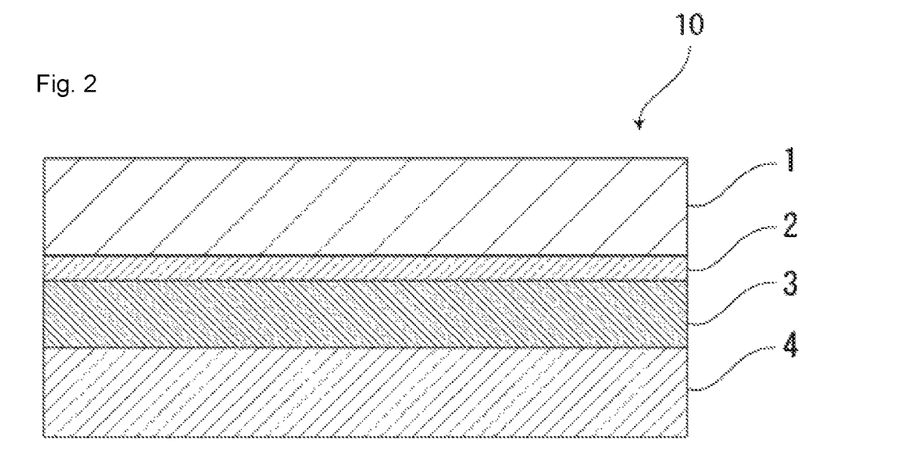
FIG. 2 is a diagram showing one example of a cross-sectional structure of a battery packaging material of the present invention.
Figure 3:
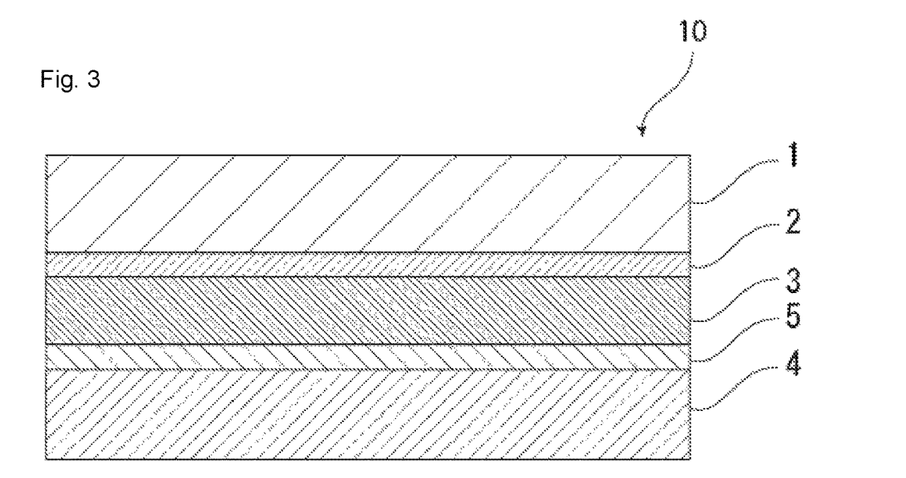
FIG. 3 is a diagram showing one example of a cross-sectional structure of a battery packaging material of the present invention.

As shown in FIG. 2, the battery packaging material 10 of the present invention may optionally include an adhesive agent layer 2 between the base material layer 1 and the barrier layer 3, in order to improve the adhesion between these layers. Furthermore, as shown in FIG. 3, the battery packaging material 10 of the present invention may also optionally include an adhesive layer 5 between the barrier layer 3 and the heat-sealable resin layer 4, in order to improve the adhesion between these layers.

2. Compositions of Layers that Form Battery Packaging Material

[Base Material Layer 1]

In the battery packaging material of the present invention, the base material layer 1 is positioned as an outermost layer. The material that forms the base material layer 1 is not particularly limited so long as it has insulation properties.

Examples of materials that form the base material layer 1 include polyesters, polyamides, epoxy resins, acrylic resins, fluororesins, polyurethanes, silicone resins, phenol resins, polyether imides, polyimides, and mixtures or copolymers thereof.

Specific examples of polyesters include polyethylene terephthalate, polybutylene terephthalate, polyethylene naphthalate, polybutylene naphthalate, polyethylene isophthalate, polycarbonate, copolyesters containing ethylene terephthalate as a main repeating unit, and copolyesters containing butylene terephthalate as a main repeating unit. Specific examples of copolyesters containing ethylene terephthalate as a main repeating unit include copolyesters obtained by polymerizing ethylene isophthalate with ethylene terephthalate as a main repeating unit (abbreviated as polyethylene (terephthalate/isophthalate); hereinafter abbreviations are made in the same manner), polyethylene (terephthalate/isophthalate), polyethylene (terephthalate/adipate), polyethylene (terephthalate/sodium sulfoisophthalate), polyethylene (terephthalate/sodium isophthalate), polyethylene (terephthalate/phenyl-dicarboxylate), and polyethylene (terephthalate/decane dicarboxylate). Specific examples of copolyesters containing butylene terephthalate as a main repeating unit include copolyesters obtained by polymerizing butylene isophthalate with butylene terephthalate as a main repeating unit (abbreviated as polybutylene (terephthalate/isophthalate); hereinafter abbreviations are made in the same manner), polybutylene (terephthalate/adipate), polybutylene (terephthalate/sebacate), polybutylene (terephthalate/decane dicarboxylate), and polybutylene naphthalate. These polyesters may be used alone, or in combination of two or more. Polyesters are suitably used as the material that forms the base material layer 1, because they have the advantage of having excellent electrolytic solution resistance, and being unlikely to cause whitening or the like due to deposition of the electrolytic solution.

Specific examples of polyamides include aliphatic polyamides such as nylon 6, nylon 66, nylon 610, nylon 12, nylon 46, and copolymers of nylon 6 and nylon 66; polyamides containing aromatics such as hexamethylenediamine-isophthalic acid-terephthalic acid copolyamides containing a structural unit derived from terephthalic acid and/or isophthalic acid, such as nylon 6I, nylon 6T, nylon 6IT, and nylon 6I6T (I denotes isophthalic acid, and T denotes terephthalic acid), and polymethaxylylene adipamide (MXD6); cycloaliphatic polyamides such as polyaminomethyl cyclohexyl adipamide (PACM 6); polyamides copolymerized with a lactam component or an isocyanate component such as 4,4'-diphenylmethane-diisocyanate, and polyester amide copolymers or polyether ester amide copolymers that are copolymers of copolyamides and polyesters or polyalkylene ether glycol; and copolymers thereof. These polyamides may be used alone, or in combination of two or more. Stretched polyamide films are suitably used as the material that forms the base material layer 1, because they have excellent stretchability, and can prevent the occurrence of whitening due to resin breakage in the base material layer 1 during molding.

The base material layer 1 may be formed of a uniaxially or biaxially stretched resin film, or may be formed of an unstretched resin film. Among the above, a uniaxially or biaxially stretched resin film, particularly a biaxially stretched resin film, is suitably used as the base material layer 1, because it has improved heat resistance through oriented crystallization. The base material layer 1 may be formed by coating the barrier layer 3 with the above-described material.

Among the above, nylons and polyesters are preferred, biaxially stretched nylons and biaxially stretched polyesters are more preferred, and biaxially stretched nylons are particularly preferred, as the resin film that forms the base material layer 1.

The base material layer 1 can also be laminated with at least one of a resin film and a coating made of a different material, in order to improve the pinhole resistance, and the insulation properties when used as a packaging material for a battery. Specific examples include a multilayer structure in which a polyester film and a nylon film are laminated, and a multilayer structure in which a biaxially stretched polyester and a biaxially stretched nylon are laminated. When the base material layer 1 has a multilayer structure, the resin films may be bonded with an adhesive, or may be directly laminated without an adhesive. Examples of methods for bonding the resin films without an adhesive include methods in which the resin films are bonded in a heat-melted state, such as a co-extrusion lamination method, a sandwich lamination method, and a thermal lamination method. When the resin films are bonded with an adhesive, the adhesive to be used may be a two-liquid curable adhesive or a one-liquid curable adhesive. Furthermore, the adhesion mechanism of the adhesive is not particularly limited, and may be any of a chemical reaction type, a solvent volatilization type, a heat melting type, a heat pressing type, an EB curing type, a UV curing type, and the like. Examples of components that form the adhesive include polyester-based resins, polyether-based resins, polyurethane-based resins, epoxy-based resins, phenol resin-based resins, polyamide-based resins, polyolefin-based resins, polyvinyl acetate-based resins, cellulose-based resins, (meth)acrylic-based resins, polyimide-based resins, amino resins, rubbers, and silicone-based resins.

The thickness of the base material layer 1 is, for example, about 4 to 50 µm, and preferably about 9 to 30 µm.

[Adhesive Agent Layer 2]

In the battery packaging material of the present invention, the adhesive agent layer 2 is a layer that is optionally provided between the base material layer 1 and the barrier layer 3, in order to bond these layers.

The adhesive agent layer 2 is formed of an adhesive capable of bonding the base material layer 1 and the barrier layer 3. The adhesive to be used for forming the adhesive agent layer 2 may be a two-liquid curable adhesive or a one-liquid curable adhesive. Furthermore, the adhesion mechanism of the adhesive used for forming the adhesive agent layer 2 is not particularly limited, and may be any of a chemical reaction type, a solvent volatilization type, a heat melting type, a heat pressing type, and the like.

Specific examples of resin components of the adhesive usable for forming the adhesive agent layer 2 include polyester-based resins such as polyethylene terephthalate, polybutylene terephthalate, polyethylene naphthalate, polybutylene naphthalate, polyethylene isophthalate, polycarbonate, and copolyesters; polyether-based adhesives; polyurethane-based adhesives; epoxy-based resins; phenol resin-based resins; polyamide-based resins such as nylon 6, nylon 66, nylon 12, and copolyamides; polyolefin-based resins such as polyolefins, acid-modified polyolefins, and metal-modified polyolefins; polyvinyl acetate-based resins; cellulose-based adhesives; (meth)acrylic-based resins; polyimide-based resins; amino resins such as urea resins and melamine resins; rubbers such as chloroprene rubber, nitrile rubber, and styrene-butadiene rubber; silicone-based resins;

and fluorinated ethylene propylene copolymer. These adhesive components may be used alone, or in combination of two or more. While the combination of two or more adhesive components is not particularly limited, examples of combinations of adhesive components include mixed resins of polyamides and acid-modified polyolefins, mixed resins of polyamides and metal-modified polyolefins, mixed resins of polyamides and polyesters, mixed resins of polyesters and acid-modified polyolefins, and mixed resins of polyesters and metal-modified polyolefins. Among the above, preferred are polyurethane-based two-liquid curable adhesives; and polyamides, polyesters, or blend resins of these resins and modified polyolefins, for example, because they are excellent in ductility, durability and yellowing-inhibiting action under high-humidity conditions, thermal degradation-inhibiting action during heat-sealing, and the like, and effectively suppress the occurrence of delamination by preventing a decrease in the lamination strength between the base material layer 1 and the barrier layer 3.

The adhesive agent layer 2 may be multilayered with different adhesive components. When the adhesive agent layer 2 is multilayered with different adhesive components, in order to improve the lamination strength between the base material layer 1 and the barrier layer 3, it is preferred to select a resin having excellent adhesion to the base material layer 1 as the adhesive component to be disposed on the base material layer 1 side, and select an adhesive component having excellent adhesion to the barrier layer 3 as the adhesive component to be disposed on the barrier layer 3 side. When the adhesive agent layer 2 is multilayered with different adhesive components, specific examples of preferred adhesive components to be disposed on the barrier layer 3 side include acid-modified polyolefins, metal-modified polyolefins, mixed resins of polyesters and acid-modified polyolefins, and resins containing copolyesters.

The thickness of the adhesive agent layer 2 is, for example, about 2 to 50 μm, and preferably about 3 to 25 μm.

[Barrier Layer 3]

In the battery packaging material, the barrier layer 3 is a layer that serves to improve the strength of the battery packaging material, and prevent the ingress of water vapor, oxygen, light, and the like into the battery. Specific examples of metals constituting the barrier layer 3 include aluminum, stainless steel, and titanium, with aluminum being preferred. The barrier layer 3 can be formed of, for example, metal foil or a vapor-deposited metal film, a vapor-deposited inorganic oxide film, a vapor-deposited carbon-containing inorganic oxide film, or a film provided with any of these vapor-deposited films. The barrier layer 3 is preferably formed of metal foil, and more preferably formed of aluminum alloy foil. In order to prevent the generation of creases and pinholes in the barrier layer 3 during the production of the battery packaging material, the barrier layer is preferably formed of soft aluminum alloy foil, for example, annealed aluminum (JIS H4160: 1994 A8021 H-O, JIS H4160: 1994 A8079 H-O, JIS H4000: 2014 A8021 P-O, and JIS H4000: 2014 A8079 P-O).

The thickness of the barrier layer 3 is, for example, about 10 to 200 μm, and preferably about 20 to 100 μm.

Furthermore, the barrier layer 3 is preferably subjected to a chemical conversion treatment on at least one surface, preferably the surface having the heat-sealable resin layer 4, and more preferably both surfaces, in order to stabilize the adhesion, and prevent dissolution or corrosion, for example. As used herein, the chemical conversion treatment refers to a treatment for forming an acid resistance film on a surface of the barrier layer 3. That is, the barrier layer 3 preferably comprises an acid resistance film layer on at least one surface thereof. Examples of chemical conversion treatments for forming the acid resistance film layer include a chromic acid chromate treatment using a chromic acid compound such as chromium nitrate, chromium fluoride, chromium sulfate, chromium acetate, chromium oxalate, chromium biphosphate, acetylacetate chromate, chromium chloride, or chromium potassium sulfate; a phosphoric acid treatment using a phosphoric acid compound such as sodium phosphate, potassium phosphate, ammonium phosphate, or polyphosphoric acid; and a chromate treatment using an aminated phenol polymer having any of the repeating units represented by the following general formulae (1) to (4). The aminated phenol polymer may contain the repeating units represented by the following general formulae (1) to (4) alone or in combination of two or more.

(1)

(2)

(3)

(4)

In the general formulae (1) to (4), X represents a hydrogen atom, a hydroxyl group, an alkyl group, a hydroxyalkyl group, an allyl group, or a benzyl group. $R^1$ and $R^2$ are the same or different, and each represent a hydroxyl group, an alkyl group, or a hydroxyalkyl group. In the general formulae (1) to (4), examples of alkyl groups represented by X, $R^1$, and $R^2$ include linear or branched alkyl groups having 1 to 4 carbon atoms, such as a methyl group, an ethyl group, a n-propyl group, an isopropyl group, a n-butyl group, an isobutyl group, and a tert-butyl group. Examples of hydroxyalkyl groups represented by X, $R^1$, and $R^2$ include linear or branched alkyl groups having 1 to 4 carbon atoms, which are substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group, or a 4-hydroxybutyl group. In the general formulae (1) to (4), X is preferably a hydrogen atom, a hydroxyl group, or a hydroxyalkyl group. The number average molecular weight of the aminated phenol polymer having any of the repeating units represented by the general formulae (1) to (4) is, for example, about 500 to 1000000, preferably about 1000 to 20000.

Examples of chemical conversion treatment methods for imparting corrosion resistance to the barrier layer 3 include a method in which the barrier layer 3 is coated with a dispersion of fine particles of a metal oxide such as aluminum oxide, titanium oxide, cerium oxide, or tin oxide, or barium sulfate in phosphoric acid, and baked at 150° C. or higher to form a corrosion resistance film layer on a surface of the barrier layer 3. A resin layer obtained by crosslinking a cationic polymer with a crosslinking agent may also be formed on the corrosion resistance film layer. Examples of the cationic polymer to be used herein include polyethyleneimine, ion polymer complexes composed of polymers containing polyethyleneimine and carboxylic acids, primary amine-grafted acrylic resins obtained by grafting primary amines to an acrylic backbone, polyallylamine or derivatives thereof, and aminophenol. These cationic polymers may be used alone, or in combination of two or more. Examples of crosslinking agents include compounds having at least one functional group selected from the group consisting of an isocyanate group, a glycidyl group, a carboxyl group, and an oxazoline group, and silane coupling agents. These crosslinking agents may be used alone, or in combination of two or more.

These chemical conversion treatments may be performed alone, or in combination of two or more. These chemical conversion treatments may be performed using one compound alone, or using two or more compounds in combination. Among these chemical conversion treatments, a chromic acid chromate treatment is preferred, and a chromate treatment using a chromic acid compound, a phosphoric acid compound, and the aminated phenol polymer in combination is more preferred.

The amount of the acid resistance film to be formed on the surface of the barrier layer 3 in the chemical conversion treatment is not particularly limited; for example, when a chromate treatment is performed using a chromic acid compound, a phosphoric acid compound, and the aminated phenol polymer in combination, it is preferred that the chromic acid compound be contained in an amount of about 0.5 to 50 mg, preferably about 1.0 to 40 mg, calculated as chromium, the phosphoric acid compound be contained in an amount of about 0.5 to 50 mg, preferably about 1.0 to 40 mg, calculated as phosphorus, and the aminated phenol polymer be contained in an amount of about 1 to 200 mg, preferably about 5.0 to 150 mg, per $m^2$ of the surface of the barrier layer 3.

The chemical conversion treatment is performed by applying the solution containing a compound to be used for forming the acid resistance film to a surface of the barrier layer 3, using a bar coating method, a roll coating method, a gravure coating method, an immersion method, or the like, followed by heating such that the temperature of the barrier layer 3 becomes about 70 to 200° C. Moreover, before the barrier layer 3 is subjected to the chemical conversion treatment, the barrier layer 3 may be subjected to a degreasing treatment using an alkali immersion method, an electrolytic cleaning method, an acid cleaning method, an electrolytic acid cleaning method, or the like. The degreasing treatment allows the chemical conversion treatment of the surface of the barrier layer 3 to be more efficiently performed.

[Heat-Sealable Resin Layer 4]

In the battery packaging material of the present invention, the heat-sealable resin layer 4 is a layer that corresponds to an innermost layer, and is heat-welded with itself during the assembly of a battery to hermetically seal the battery element.

In the present invention, the heat-sealable resin layer contains a lubricant. While the lubricant is not particularly limited, it is preferably an amide-based lubricant, for example. While the amide-based lubricant is not particularly limited so long as it has an amide group, preferred examples thereof include fatty acid amides and aromatic bis-amides. These lubricants may be used alone, or in combination of two or more.

Examples of fatty acid amides include saturated fatty acid amides, unsaturated fatty acid amides, substituted amides, methylol amides, saturated fatty acid bis-amides, and unsaturated fatty acid bis-amides. Specific examples of saturated fatty acid amides include lauramide, palmitamide, stearamide, behenamide, and hydroxystearamide. Specific examples of unsaturated fatty acid amides include oleamide and erucamide. Specific examples of substituted amides include N-oleyl palmitamide, N-stearyl stearamide, N-stearyl oleamide, N-oleyl stearamide, and N-stearyl erucamide. Specific examples of methylol amides include methylol stearamide. Specific examples of saturated fatty acid bis-amides include methylene-bis-stearamide, ethylene-bis-capramide, ethylene-bis-lauramide, ethylene-bis-stearamide, ethylene-bis-hydroxystearamide, ethylene-bis-behenamide, hexamethylene-bis-stearamide, hexamethylene-bis-behenamide, hexamethylene hydroxystearamide, N,N'-distearyl adipamide, and N,N'-distearyl sebacamide. Specific examples of unsaturated fatty acid bis-amides include ethylene-bis-oleamide, ethylene-bis-erucamide, hexamethylene-bis-oleamide, N,N'-dioleyl adipamide, and N,N'-dioleyl sebacamide. Specific examples of fatty acid ester amides include stearamide ethyl stearates. Specific examples of aromatic bis-amides include m-xylylene-bis-stearamide, m-xylylene-bis-hydroxystearamide, and N,N'-distearyl isophthalamide.

While the amount of the lubricant contained in the heat-sealable resin layer 4 is not particularly limited, it is preferably about 100 to 2000 ppm, and more preferably about 500 to 1200 ppm, in order to suppress the adhesion of the lubricant to the mold during molding to achieve excellent continuous productivity of batteries, while improving the moldability of the battery packaging material.

The heat-sealable resin layer 4 is preferably formed of a polyolefin. While the polyolefin is not particularly limited so long as it can be heat-welded, examples thereof include polyolefins, cyclic polyolefins, carboxylic acid-modified polyolefins, and carboxylic acid-modified cyclic polyolefins.

Specific examples of the polyolefin include polyethylene such as low-density polyethylene, medium-density polyethylene, high-density polyethylene, and linear low-density polyethylene; polypropylene such as homopolypropylene, block copolymers of polypropylene (for example, block copolymers of propylene and ethylene), and random copolymers of polypropylene (for example, random copolymers of propylene and ethylene); terpolymers of ethylene-butene-propylene; and the like. Among these polyolefins, polyethylene and polypropylene are preferred.

The cyclic polyolefin is a copolymer of an olefin and a cyclic monomer. Examples of the olefin as a constituent monomer of the cyclic polyolefin include ethylene, propylene, 4-methyl-1-pentene, styrene, butadiene, and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene, and norbornadiene. Among these polyolefins, cyclic alkenes are preferred, and norbornene is more preferred.

The carboxylic acid-modified polyolefin is a polymer obtained by modifying the polyolefin by block polymerization or graft polymerization with a carboxylic acid. Examples of the carboxylic acid to be used for the modification include maleic acid, acrylic acid, itaconic acid, crotonic acid, maleic anhydride, and itaconic anhydride.

The carboxylic acid-modified cyclic polyolefin is a polymer obtained by replacing a portion of the monomers constituting the cyclic polyolefin with an α,β-unsaturated carboxylic acid or an anhydride thereof, and copolymerizing them, or by block-polymerizing or graft-polymerizing an α,β-unsaturated carboxylic acid or an anhydride thereof onto the cyclic polyolefin. The cyclic polyolefin to be modified with a carboxylic acid is the same as described above. The carboxylic acid to be used for the modification is the same as that used for the modification of the acid-modified cycloolefin copolymer.

Among these resin components, polypropylene is preferred as the resin constituting the heat-sealable resin layer 4, and random polypropylene is more preferred. That is, the heat-sealable resin layer 4 may contain a polyolefin backbone, and preferably contains a polyolefin backbone. The inclusion of a polyolefin backbone in the heat-sealable resin layer 4 can be analyzed by, for example, infrared spectroscopy or gas chromatography-mass spectrometry, although the analytical method is not particularly limited. For example, when a maleic anhydride-modified polyolefin is measured by infrared spectroscopy, peaks derived from maleic anhydride are detected at a wavelength of around 1760 cm' and a wavelength of 1780 cm'. However, if the degree of acid modification is low, the peaks may be so small that they cannot be detected. In that case, the analysis can be conducted by nuclear magnetic resonance spectroscopy. Polypropylene is preferred as the resin constituting the surface of the heat-sealable resin layer 4 into which the indenter is to be pressed, and random polypropylene is more preferred.

The heat-sealable resin layer 4 may be formed using one resin component alone, or may be formed using a blend polymer obtained by combining two or more resin components. Furthermore, the heat-sealable resin layer 4 may be composed of only one layer, or two or more layers formed of the same resin component or different resin components.

Figure 4:
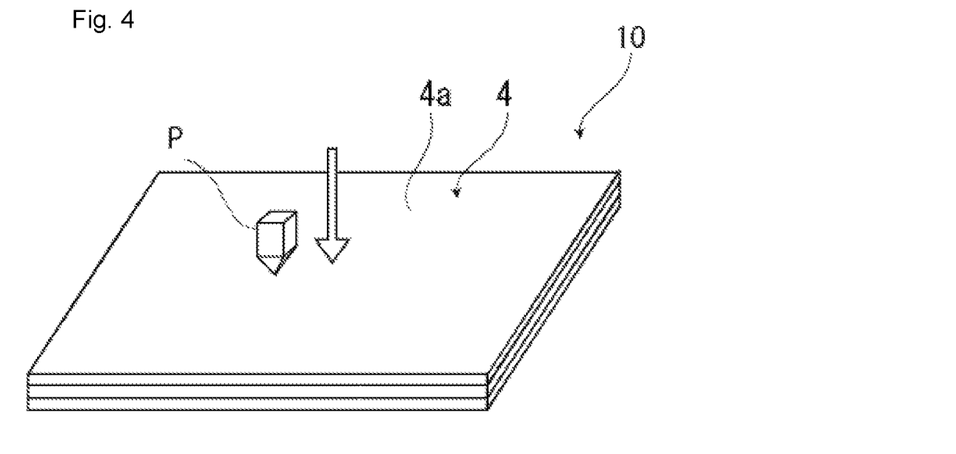
FIG. 4 is a schematic diagram for use in explaining the operation of pressing an indenter into a surface of the heat-sealable resin layer of a battery packaging material of the present invention.

In the present invention, the heat-sealable resin layer 4 is characterized in that, as shown in FIG. 4, when a Vickers-shaped indenter P is pressed into a surface 4a of the heat-sealable resin layer 4 opposite to the barrier layer 3 at a loading speed of 5 mN/10 sec (pressed in the thickness direction of the heat-sealable resin layer 4), using PICODENTOR (registered trademark) HM500, in an environment at a temperature of 24° C. and a relative humidity of 50%, the indentation depth of the indenter into the heat-sealable resin layer 4 at the point when the load on the indenter reaches 3.0 mN is 5.8 μm or less.

As described above, when a mold made of stainless steel having high surface smoothness (for example, a mold having a surface Rz (maximum height of roughness profile) of 0.8 μm, as specified in Table 2 of JIS B 0659-1: 2002 Appendix 1 (Referential) Surface Roughness Standard Specimens for Comparison; for determination of Rz, a surface roughness standard specimen for comparison from Nihon Kinzoku Denchu Co., Ltd. is used.) is used as the mold for molding the battery packaging material, the area of contact between the mold and the heat-sealable resin layer is large, and thus, the lubricant positioned on the surface of the heat-sealable resin layer is likely to be abraded, which is likely to cause the lubricant positioned on the surface of the heat-sealable resin layer to be transferred into the mold. As a result, the mold is contaminated, and the continuous productivity of batteries decreases.

On the other hand, in the battery packaging material of the present invention, because the heat-sealable resin layer 4 has the specific hardness as described above, even when the battery packaging material is molded in a mold having high surface smoothness, the lubricant positioned on the surface of the heat-sealable resin layer is unlikely to be abraded, and thus, is unlikely to be transferred into the mold. This effectively suppresses the contamination of the mold. Therefore, the continuous productivity of batteries can be improved by using the battery packaging material of the present invention in the production of batteries.

In order to further improve the continuous productivity of batteries, the indentation depth of the indenter into the heat-sealable resin layer 4 is preferably about 5.5 μm or less, and more preferably about 5.3 μm or less. In order to facilitate a comparative determination of the amount of indentation, the lower limit of the indentation depth is, for example, about 4.5 μm or about 4.8 μm.

The Vickers-shaped indenter to be used in the present invention is an (Vickers-type) indenter made of a diamond chip whose edge is square pyramid-shaped.

Furthermore, in the battery packaging material of the present invention, the dynamic friction coefficient of the surface 4a of the heat-sealable resin layer 4 opposite to the barrier layer 3 is preferably 0.4 or less, as measured under the below-described test conditions (pursuant to JIS K7125: 1999). This can further improve the moldability and continuous productivity of batteries obtained using the battery packaging material of the present invention. The dynamic friction coefficient is measured in an environment at a temperature of 24° C. and a relative humidity of 50%.

(Test Conditions)

Figure 5:
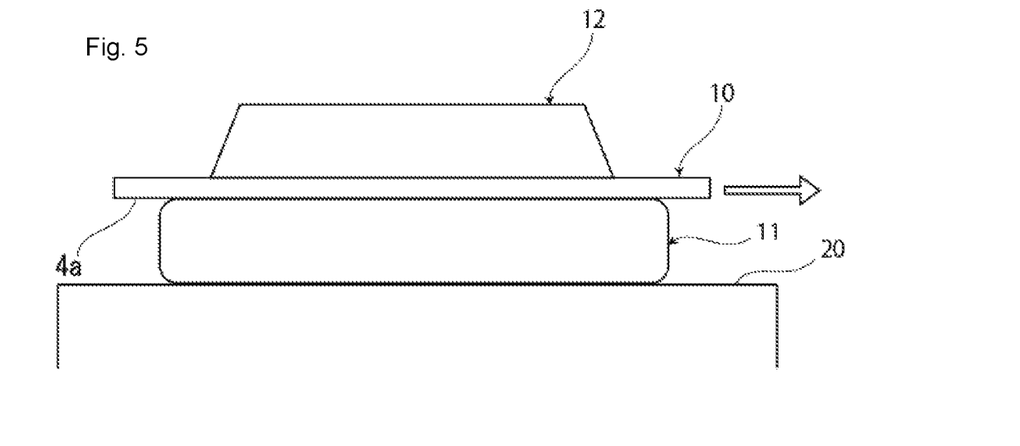
FIG. 5 is a schematic diagram for use in explaining the method for measuring the dynamic friction coefficient of a surface of the heat-sealable resin layer of a battery packaging material of the present invention.

As shown in FIG. 5, a battery packaging material 10 is allowed to stand, with the heat-sealable resin layer 4 facing down, on a surface of a metal plate 11 having a rectangular shape in a plan view, which is allowed to stand on a horizontal surface 20. Next, a 200-g weight 12 is placed on the surface of the battery packaging material 10 having the base material layer 1. The battery packaging material 10 is then pulled 25 mm in a horizontal direction (direction perpendicular to the thickness direction of the heat-sealable resin layer 4) at a tensile speed of 100 mm/min, and a dynamic friction coefficient at this time is measured. The metal plate 11, the battery packaging material 10, and the weight 12 are allowed to stand such that their centers are aligned in a plan view when they are stacked on one another.

The metal plate 11 is made of stainless steel having a surface Rz (maximum height of roughness profile) of 0.8 μm, as specified in Table 2 of JIS B 0659-1: 2002 Appendix 1 (Referential) Surface Roughness Standard Specimens for Comparison. The area of contact between the surface of the metal plate 11 and the heat-sealable resin layer 4 of the battery packaging material 10 is 160 cm' (the surface of contact is square). The area of contact between the weight 12 and the surface of the battery packaging material 10 having the base material layer 1 is 40 cm' (the surface of contact is square).

In order to facilitate a comparative determination of the amount of indentation, the lower limit of the dynamic friction coefficient is, for example, 0.1 or 0.2.

Examples of methods for adjusting the indentation depth in the present invention include a method in which the melt mass-flow rate (MFR) of the resin constituting the heat-sealable resin layer 4 is adjusted. The MFR at 230° C. of the resin constituting the heat-sealable resin layer 4 is preferably 5.0 g/10 min or more, and more preferably about 10 to 20 g/10 min. The higher the MFR, the deeper the indentation depth tends to be, and the lower the MFR, the shallower the indentation depth tends to be. A commercially available product can be used as a resin having a desired MFR.

While the thickness of the heat-sealable resin layer 4 can be selected as appropriate, it is, for example, about 10 to 100 μm, and preferably about 15 to 50 μm.

[Adhesive Layer 5]

In the battery packaging material of the present invention, the adhesive layer 5 is a layer that is optionally provided between the barrier layer 3 and the heat-sealable resin layer 4, in order to strongly bond these layers.

The adhesive layer 5 is formed of an adhesive capable of bonding the barrier layer 3 and the heat-sealable resin layer 4. The adhesive to be used for forming the adhesive layer 5 is the same as those for the adhesive agent layer 2 in terms of adhesion mechanism, types of adhesive components, and the like. The adhesive layer 5 can also be formed of any of the resins mentioned above for the heat-sealable resin layer 4. When any of the resins mentioned for the heat-sealable resin layer 4 is used as the adhesive component to be used for the adhesive layer 5, the adhesive component is, for example, an acid-modified polyolefin, preferably a carboxylic acid-modified polyolefin, and particularly preferably carboxylic acid-modified polypropylene. Specific examples of these resins include the same resins as mentioned for the heat-sealable resin layer 4. In particular, carboxylic acid-modified polypropylene is preferred in that it has excellent adhesion to the barrier layer. That is, the adhesive layer 5 may contain a polyolefin backbone, and preferably contains a polyolefin backbone. The inclusion of a polyolefin backbone in the adhesive layer 5 can be analyzed by, for example, infrared spectroscopy or gas chromatography-mass spectrometry, although the analytical method is not particularly limited. For example, when a maleic anhydride-modified polyolefin is measured by infrared spectroscopy, peaks derived from maleic anhydride are detected at a wavelength of around 1760 cm' and a wavelength of 1780 cm'. However, if the degree of acid modification is low, the peaks may be so small that they cannot be detected. In that case, the analysis can be conducted by nuclear magnetic resonance spectroscopy.

The thickness of the adhesive layer 5 is, for example, about 2 to 50 μm, and preferably about 15 to 40 μm.

3. Method for Producing Battery Packaging Material

The method for producing the battery packaging material of the present invention is not particularly limited so long as a laminate including layers each having a predetermined composition is obtained. Specifically, the battery packaging material of the present invention can be produced using a method comprising the step of laminating at least a base material layer, a barrier layer, and a heat-sealable resin layer in this order to provide a laminate, wherein a heat-sealable resin layer containing a lubricant is used as the heat-sealable resin layer, and the heat-sealable resin layer laminated in the step is a heat-sealable resin layer in which, when a Vickers-shaped indenter is pressed into a surface of the heat-sealable resin layer opposite to the barrier layer at a loading speed of 5 mN/10 sec, using PICODENTOR (registered trademark) HM500, in an environment at a temperature of 24° C. and a relative humidity of 50%, an indentation depth of the indenter into the heat-sealable resin layer at the point when a load on the indenter reaches 3.0 mN is 5.8 μm or less.

The composition and the like of each of the layers constituting the battery packaging material are as described above. Specific examples of the method for producing the battery packaging material of the present invention include the following method.

Initially, a laminate in which the base material layer 1, the adhesive agent layer 2, and the barrier layer 3 are laminated in this order (the laminate may be hereinafter denoted as the "laminate A") is formed. Specifically, the laminate A can be formed using a dry lamination method as follows: The adhesive to be used for forming the adhesive agent layer 2 is applied to the base material layer 1 or the barrier layer 3 whose surface has been optionally subjected to a chemical conversion treatment, using a coating method such as an extrusion method, a gravure coating method, or a roll coating method, and then dried. Then, the barrier layer 3 or the base material layer 1 is laminated thereon, and the adhesive agent layer 2 is cured.

Next, the heat-sealable resin layer 4 is laminated on the barrier layer 3 of the laminate A. When the heat-sealable resin layer 4 is laminated directly on the barrier layer 3, a resin component that forms the heat-sealable resin layer 4 may be applied to the barrier layer 3 of the laminate A, using a method such as a gravure coating method or a roll coating method. When the adhesive layer 5 is provided between the barrier layer 3 and the heat-sealable resin layer 4, examples of methods include the following: (1) a method in which the adhesive layer 5 and the heat-sealable resin layer 4 are co-extruded to be laminated on the barrier layer 3 of the laminate A (co-extrusion lamination method); (2) a method in which a laminate in which the adhesive layer 5 and the heat-sealable resin layer 4 are laminated is separately formed, and this laminate is laminated on the barrier layer 3 of the laminate A using a thermal lamination method; (3) a method in which the adhesive for forming the adhesive layer 5 is laminated on the barrier layer 3 of the laminate A by, for example, applying the adhesive onto the barrier layer 3 using an extrusion method or solution coating, followed by drying at a high temperature and baking, and then the heat-sealable resin layer 4 formed into a sheet in advance is laminated on the adhesive layer 5 using a thermal lamination method; and (4) a method in which the melted adhesive layer 5 is poured between the barrier layer 3 of the laminate A and the heat-sealable resin layer 4 formed into a sheet in advance, and simultaneously the laminate A and the heat-sealable resin layer 4 are bonded with the adhesive layer 5 interposed therebetween (sandwich lamination method). The laminate may further be subjected to a heat treatment of a heat-roll contact type, a hot-air type, or a near- or far-infrared radiation type, in order to enhance the adhesion of the adhesive agent layer 2 and the optionally provided adhesive layer 5. Such a heat treatment may be performed, for example, at 150 to 250° C. for 1 to 5 minutes.

In the battery packaging material of the present invention, the layers that form the laminate may be optionally subjected to a surface activation treatment such as a corona treatment, a blast treatment, an oxidation treatment, or an ozone treatment, in order to improve or stabilize the film formability, lamination processing, suitability for final product secondary processing (pouching and embossing molding), and the like.

4. Use of Battery Packaging Material

The battery packaging material of the present invention is used as a packaging material for hermetically sealing and housing battery elements such as a positive electrode, a negative electrode, and an electrolyte.

Specifically, a battery that uses the battery packaging material is provided as follows: A battery element comprising at least a positive electrode, a negative electrode, and an electrolyte is covered with the battery packaging material of the present invention such that a flange portion (region where the heat-sealable resin layer is brought into contact with itself) can be formed on the periphery of the battery element, while a metal terminal connected to each of the positive electrode and the negative electrode protrudes to the outside. Then, the heat-sealable resin layer in the flange portion is heat-sealed with itself to hermetically seal the battery element. When the battery packaging material of the present invention is used to house the battery element, it is used such that the sealant region of the battery packaging material of the present invention is positioned on the inner side (surface that contacts the battery element) thereof.

The battery packaging material of the present invention may be used for either primary batteries or secondary batteries, preferably secondary batteries. While the type of secondary battery to which the battery packaging material of the present invention is applied is not particularly limited, examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers, and capacitors. Among these secondary batteries, preferred secondary batteries to which the battery packaging material of the present invention is applied include lithium ion batteries and lithium ion polymer batteries.

EXAMPLES

The present invention will be hereinafter described in detail with reference to examples and comparative examples; however, the present invention is not limited to the examples.

Examples 1-12 and Comparative Examples 1-2

<Production of Battery Packaging Materials>

A barrier layer (thickness: 40 μm) as shown in Table 1, whose both surfaces had been subjected to a chemical conversion treatment, was laminated on a base material layer as shown in Table 1, using a dry lamination method. Specifically, a two-liquid urethane adhesive (a polyol compound and an aromatic isocyanate-based compound) was applied to one surface of the barrier layer to form an adhesive agent layer (thickness: 3 μm) on the barrier layer. When the base material layer was composed of a single layer, the thickness was 25 μm, and when the base material layer was composed of PET/nylon, PET (12 μm) and nylon (15 μm) were laminated in this order from the outer side (opposite to the barrier layer) of the battery packaging material. Next, the adhesive agent layer on the barrier layer and the base material layer were laminated together using a dry lamination method, and then subjected to an aging treatment at 40° C. for 24 hours to prepare a laminate having the base material layer/the adhesive agent layer/the barrier layer. The chemical conversion treatment of the barrier layer was performed by applying a treatment solution containing a phenol resin, a chromium fluoride compound, and phosphoric acid to both surfaces of the barrier layer using a roll coating method, such that the amount of chromium applied became 10 mg/m$^2$ (dry mass), followed by baking. Next, acid-modified polypropylene (PPa, to be disposed on the barrier layer) with a thickness of 40 μm and polypropylene (PP, to be disposed as an innermost layer) with a thickness of 40 μm were co-extruded onto the barrier layer of the laminate, thereby laminating an adhesive layer and a heat-sealable resin layer on the barrier layer. As a result, a battery packaging material was obtained in which the base material layer/the adhesive agent layer/the barrier layer/the adhesive layer/the heat-sealable resin layer were laminated in this order. The details of the acid-modified polyolefins and the polypropylene used in the examples and comparative examples are as set forth below (Table 1):

Acid-modified polypropylene A (PPa-A): maleic anhydride-modified polypropylene having an MFR at 230° C. of 8 g/10 min, and containing 0 ppm of a lubricant Acid-modified polypropylene B (PPa-B): maleic anhydride-modified polypropylene having an MFR at 230° C. of 10 g/10 min, and containing 0 ppm of a lubricant Acid-modified polypropylene C (PPa-C): maleic anhydride-modified polypropylene having an MFR at 230° C. of 12 g/10 min, and containing 0 ppm of a lubricant Polypropylene A (PP-A): random polypropylene having an MFR at 230° C. of 16 g/10 min, and containing 700 ppm of erucamide as a lubricant Polypropylene B (PP-B): random polypropylene having an MFR at 230° C. of 20 g/10 min, and containing 700 ppm of erucamide as a lubricant Polypropylene C (PP-C): random polypropylene having an MFR at 230° C. of 20 g/10 min, and containing 1200 ppm of erucamide as a lubricant Polypropylene D (PP-D): random polypropylene having an MFR at 230° C. of 18 g/10 min, and containing 1200 ppm of erucamide as a lubricant <Measurement of Indentation Depth with PICODENTOR>

An indentation depth into the surface of the heat-sealable resin layer of each of the battery packaging materials obtained above was measured using PICODENTOR (HM-500 from Fischer Instruments K.K.). Specifically, an indenter was gradually pressed into the surface of the heat-sealable resin layer opposite to the barrier layer at a loading speed of 5 mN/10 sec, using PICODENTOR, in an environment at a temperature of 24° C. and a relative humidity of 50%, and an indentation depth of the indenter at the point when the load on the indenter reached 3.0 mN was measured. The results are shown in Table 1. As the indenter, a square pyramidal (Vickers-type; angle between opposite faces: 136°) indenter having an edge made of a diamond chip was used.

<Measurement of Dynamic Friction Coefficient>

A dynamic friction coefficient of the surface of the heat-sealable resin layer of each of the battery packaging materials obtained above was measured under the following test conditions. The results are shown in Table 1.

(Test Conditions)

The battery packaging material was allowed to stand, with the heat-sealable resin layer facing down, on a surface of a metal plate having a rectangular shape in a plan view, which was allowed to stand on a horizontal surface. A 200-g weight was then placed on a surface of the battery packaging material having the base material layer. The battery packaging material was then pulled 25 mm in a horizontal direction at a tensile speed of 100 mm/min, and a dynamic friction coefficient at this time was measured. The metal plate was made of stainless steel having a surface Rz (maximum height of roughness profile) of 0.8 µm, as specified in Table 2 of JIS B 0659-1: 2002 Appendix 1 (Referential) Surface Roughness Standard Specimens for Comparison. The area of contact between the surface of the metal plate and the heat-sealable resin layer of the battery packaging material was 160 cm² (the surface of contact was square). The area of contact between the weight and the surface of the battery packaging material having the base material layer was 40 cm² (the surface of contact was square).

(Evaluation of Continuous Productivity of Batteries)

Each of the battery packaging materials obtained above was cut into rectangles of 80×120 mm to prepare samples. Next, using a molding die (die) having a diameter of 30×50 mm and a corresponding molding die (punch), these samples were cold-formed at a molding depth of 5 mm under a pressing force of 0.4 MPa, in an environment at a temperature of 24° C. and a relative humidity of 50%. The cold forming was performed for 500 samples for each battery packaging material. Next, the corners of the mold after the cold forming were visually observed. Cases where whitening occurred due to transfer of the lubricant into the mold were evaluated as having low continuous productivity (C), and cases where whitening did not occur were evaluated as having high continuous productivity (A). The results are shown in Table 1. As each of the punch and the die, a mold made of stainless steel having an Rz (maximum height of roughness profile) of 0.8 µm, as specified in Table 2 of JIS B 0659-1: 2002 Appendix 1 (Referential) Surface Roughness Standard Specimens for Comparison, was used.

As is clear from the results shown in Table 1, the battery packaging materials of Examples 1 to 12 whose indentation depth described above on the surface of the heat-sealable resin layer was 5.5 µm or less are found to be excellent in continuous productivity of batteries. In contrast, the battery packaging materials of Comparative Examples 1 and 2 whose indentation depth described above on the surface of the heat-sealable resin layer was 6.2 µm or 6.1 µm are found to be poor in continuous productivity of batteries.

REFERENCE SIGNS LIST

1: base material layer
2: adhesive agent layer
3: barrier layer
4: heat-sealable resin layer
4a: surface of the heat-sealable resin layer opposite to the barrier layer
5: adhesive layer
10: battery packaging material
11: metal plate
12: weight
20: horizontal surface
P: Vickers-shaped indenter

The invention claimed is:

1. A battery packaging material comprising:
a laminate having at least a base material layer, a barrier layer, and a heat-sealable resin layer in this order,
wherein:
the heat-sealable resin layer contains a lubricant, and
when a Vickers-shaped indenter is pressed into a surface of the heat-sealable resin layer opposite to the barrier layer at a loading speed of 5 mN/10 sec in an environment at a temperature of 24° C. and a relative humidity of 50%, an indentation depth of the indenter into the

TABLE 1

| | Base Material Layer | Barrier Layer | Adhesive Layer | Heat-Sealable Resin Layer | Indentation Depth (µm) of Indenter | Dynamic Friction Coefficient | Continuous Productivity of Batteries |
|---|---|---|---|---|---|---|---|
| Comparative Example 1 | Ny | AL | PPa-A | PP-A | 6.2 | 0.35 | C |
| Comparative Example 2 | PET/Ny | AL | PPa-A | PP-A | 6.1 | 0.33 | C |
| Example 1 | Ny | AL | PPa-B | PP-B | 5.5 | 0.35 | A |
| Example 2 | PET/Ny | AL | PPa-B | PP-B | 5.5 | 0.34 | A |
| Example 3 | PBT | AL | PPa-B | PP-B | 5.5 | 0.35 | A |
| Example 4 | PET | SUS | PPa-B | PP-B | 5.5 | 0.35 | A |
| Example 5 | Ny | AL | PPa-B | PP-C | 5.5 | 0.25 | A |
| Example 6 | PET/Ny | AL | PPa-B | PP-C | 5.5 | 0.24 | A |
| Example 7 | PBT | AL | PPa-B | PP-C | 5.5 | 0.25 | A |
| Example 8 | PET | SUS | PPa-B | PP-C | 5.5 | 0.24 | A |
| Example 9 | Ny | AL | PPa-C | PP-D | 5.1 | 0.23 | A |
| Example 10 | PET/Ny | AL | PPa-C | PP-D | 5.2 | 0.24 | A |
| Example 11 | PBT | AL | PPa-C | PP-D | 5.1 | 0.23 | A |
| Example 12 | PET | SUS | PPa-C | PP-D | 5.1 | 0.24 | A |

The symbols used in Table 1 mean the following:
Ny: nylon
PET: polyethylene terephthalate
PBT: polybutylene terephthalate
PP: polypropylene
PPa: acid-modified polypropylene
PET/nylon: PET (12 µm) and nylon (15 µm) were laminated in this order from the outer side (opposite to the barrier layer) of the battery packaging material.
AL: aluminum alloy
SUS: stainless steel heat-sealable resin layer at the point when a load on the indenter reaches 3.0 mN is in a range of from 4.5 µm to 5.8 µm.

2. The battery packaging material according to claim 1, wherein a dynamic friction coefficient of the surface of the heat-sealable resin layer opposite to the barrier layer is 0.4 or less, as measured under the following test conditions:
the battery packaging material is allowed to stand, with the heat-sealable resin layer facing down, on a surface of a metal plate having a rectangular shape in a plan view, which is allowed to stand on a horizontal surface;

a 200-g weight is then placed on a surface of the battery packaging material having the base material layer; and the battery packaging material is then pulled 25 mm in a horizontal direction at a tensile speed of 100 mm/min, and a dynamic friction coefficient at this time is measured, wherein:

the metal plate is made of stainless steel having a surface Rz (maximum height of roughness profile) of 0.8 μm, as specified in Table 2 of JIS B 0659-1: 2002 Appendix 1 (Referential) Surface Roughness Standard Specimens for Comparison;

an area of contact between the surface of the metal plate and the heat-sealable resin layer of the battery packaging material is 160 cm$^2$; and an area of contact between the weight and the surface of the battery packaging material having the base material layer is 40 cm$^2$.

3. The battery packaging material according to claim 1, wherein a resin forming the heat-sealable resin layer is polypropylene.

4. The battery packaging material according to claim 1, further comprising an adhesive layer formed from acid-modified polypropylene between the barrier layer and the heat-sealable resin layer.

5. The battery packaging material according to claim 1, wherein the barrier layer is formed from an aluminum alloy or stainless steel.

6. The battery packaging material according to claim 1, further comprising an acid resistance film layer on at least one surface of the barrier layer.

7. The battery packaging material according to claim 1, which is a packaging material for secondary batteries.

8. A battery comprising a battery element comprising at least a positive electrode, a negative electrode, and an electrolyte, the battery element being housed in a package formed from the battery packaging material according to claim 1.

9. A method for producing a battery packaging material comprising:

laminating at least a base material layer, a barrier layer, and a heat-sealable resin layer in this order to provide a laminate, wherein:

a heat-sealable resin layer containing a lubricant is used as the heat-sealable resin layer, and the heat-sealable resin layer laminated in the step is a heat-sealable resin layer in which, when a Vickers-shaped indenter is pressed into a surface of the heat-sealable resin layer opposite to the barrier layer at a loading speed of 5 mN/10 sec in an environment at a temperature of 24° C. and a relative humidity of 50%, an indentation depth of the indenter into the heat-sealable resin layer at the point when a load on the indenter reaches 3.0 mN is in a range of from 4.5 μm to 5.8 μm.

10. A battery packaging material comprising:

a laminate having at least a base material layer, a barrier layer, and a heat-sealable resin layer in this order, wherein:

the heat-sealable resin layer contains a lubricant, an amount of the lubricant present in the heat-sealable resin layer is from about 100 ppm to 2,000 ppm, and when a Vickers-shaped indenter is pressed into a surface of the heat-sealable resin layer opposite to the barrier layer at a loading speed of 5 mN/10 sec in an environment at a temperature of 24° C. and a relative humidity of 50%, an indentation depth of the indenter into the heat-sealable resin layer at the point when a load on the indenter reaches 3.0 mN is 5.8 μm or less.

11. The battery packaging material according to claim 1, wherein the lubricant is an amide-based lubricant.

12. The battery packaging material according to claim 1, wherein the indentation depth is in a range of from 4.5 μm to 5.5 μm.

13. The battery packaging material according to claim 1, wherein the indentation depth is in a range of from 4.5 μm to 5.3 μm.

14. The battery packaging material according to claim 1, wherein a resin forming the heat-sealable resin layer has a mass-flow rate of from 18 g/10 min to 20 g/10 min.

15. The battery packaging material according to claim 2, wherein the dynamic friction coefficient is from 0.1 to 0.4.

16. The battery packaging material according to claim 3, wherein the polypropylene is random polypropylene.

* * * * *